United States Patent [19]

Quinn

[11] 4,332,620

[45] Jun. 1, 1982

[54] COLORED PAVING COMPOSITION

[76] Inventor: Robert L. Quinn, 6320 Falls Rd., Baltimore, Md. 21209

[21] Appl. No.: 191,902

[22] Filed: Sep. 29, 1980

[51] Int. Cl.$^3$ .......................... C08K 3/22; C08L 7/00; C08L 9/00; C08L 95/00

[52] U.S. Cl. .................................. 523/220; 260/758; 106/281 R; 524/66; 524/71

[58] Field of Search ...................... 260/28.5 B, 998.19, 260/28.5 AS, 758, 762; 106/281 R

[56] References Cited

U.S. PATENT DOCUMENTS 2,863,841 12/1958 Bernier et al. ................. 260/28.5 B
3,482,008 12/1969 Hibshman ....................... 106/281 R

OTHER PUBLICATIONS

Zimmerman and Lavine, "Handbook of Material Tradenames," Supplement I (to the 1953 Edition), Ind. Res. Serv., Inc., Dover, N.H.; 1956, p. 135.

*Primary Examiner*—Allan Lieberman
*Attorney, Agent, or Firm*—Samuel Lebowitz

[57] ABSTRACT

A paving mixture containing black asphalt which is changed to a color other than black by the addition of a limited amount of a coloring agent to the mixture, such as ferric oxide, to impart a permanent, distinctive color to the pavement without sacrificing any of the wearing qualities thereof. At the same time, the cost of the pavement is maintained within practical economic limits so that it may be used in the production of paved areas of limited extent, such as tennis courts, playgrounds, running tracks, parking lots, airport runways, etc. When the mixture is laid down in depths of one-fourth inch to twelve inches, the increased cost of the pavement is made up in a reasonably short period of time by the elimination of the need for painting the conventional black surface repeatedly, especially when the latter is subjected to extensive use and wear.

3 Claims, No Drawings

COLORED PAVING COMPOSITION

It is the object of the present invention to provide a paving composition for playgrounds, tennis courts, parking lots, airport runways, pedestrian walkways, and other paving surfaces which includes a black asphaltic type binder as well as a coloring agent to impart a graded degree of color, other than black, throughout the mass thereof. Thereby, a distinctive ground surface may be laid down without need for painting thereof which, at best, lasts for only a relatively short period of time and which requires coating the surface repeatedly upon wear and deterioration of the painted surface.

It is another object of the invention to improve upon the paving composition and the surfaces produced therewith, as disclosed in U.S. Pat. No. 2,863,841, Dec. 9, 1958, to impart a permanent distinctive color throughout the mass of the latter. Heretofore, the pavements produced in accordance with the disclosure in this patent, were black in color and required the application of colored paints or other surface coatings if any other colors were desired.

The advantageous characteristics of the pavement composition produced in accordance with the teachings in the above-mentioned patent are fully set forth therein, and are incorporated in the present disclosure by reference thereto.

Extensive experimentation in the field of producing colored paving mixtures having bituminous or asphaltic materials as a component thereof has not met with commercial success up to the present time. This is true despite the fact that the coloring of Portland cement concretes has been known in the art for decades, as exemplified by the disclosure in U.S. Pat. No. 3,068,109, Dec. 11, 1962. The use of Albino asphalt to which acrylic color pigments were added, proved impractical, probably as a consequence of the high cost of producing the former.

In accordance with the present invention, the preferred formulation of the desired colored paving composition may be as follows:
Sand and stone: 45%–80%
Bituminous binder: 6%–28%
Ferric oxide: 4%–20%

The percentages, by weight, of the specific ingredients may be varied in dependence upon the specific uses of the pavement, i.e., a pavement requiring greater strength and resistance to wear would have a higher sand and stone content, while one requiring a brighter color would include a higher quantity of ferric oxide. Also, the ferric oxide may be introduced into the black asphalt mix either in the pug mill or directly into a cold asphalt mix.

In accordance with the present invention, the paving mixture disclosed in the first-mentioned patent above, has been improved and modified by using the following ingredients:
Exfoliated vermiculite: 2% to 8%
Granulated rubber: 6% to 18%
Fine sand and stone screenings: 45% to 80%
Bituminous binder: 10% to 28%
Synthetic ferric oxide: 4% to 20%

A specific formulation of the paving mixture within the ranges above may be as follows:
Exfoliated vermiculite: 5%
Granulated rubber: 13%
Fine sand and stone screenings: 52%
Bituminous binder: 20%
Synthetic ferric oxide: 10%

The synthetic ferric oxide ingredient is preferable to the natural ferric oxide, and may be in the form of any known industrial coloring agents of this composition. The brightness or intensity of the color may be varied by varying the ratio of the quantity of ferric oxide to the bituminous binder.

A red colored pavement, as an alternative to a painted black surface, which may be laid down in depths from one-fourth inch to twelve inches or more, offers many economies in the maintenance of athletic facilities, walkways which require delineation such as bike paths, danger areas, airport runways, etc.

A variation in the coloring ingredient by the use of other metal oxides such as chromium oxide, results in different colorations. No after treatments of the deposited surface are required to attain the desired color effect.

The ferric oxide coloring agent may be introduced in the pavement mix either prior to the feeding of the total mix into a pugmill, or directly into a cold mix of asphalt combined with rubber and vermiculite.

The particle size of the several ingredients in the mixtures above may be the same as disclosed in the first-mentioned patent. Thus, the sand and stone screenings should be relatively fine, not exceeding approximately one-eighth inch. The size of the vermiculite flakes should range from 0.04 inches to approximately five-sixteenth inch, and the granulated rubber should range from 0.04 inch to approximately one-fourth inch.

I claim:

1. As asphaltic paving composition having a color other than black, and requiring no after treatments, comprised of sand and stone screenings in an amount of forty-five percent to eighty percent, a black bituminous binder therefor selected from a group consisting of tar and asphalt in an amount of six percent to twenty-eight percent, and a metallic oxide coloring agent selected from the group consisting of ferric oxide and chromium oxide in an amount of four percent to twenty percent said sand and stone screenings having a maximum particle size of approximately ⅛ inch.

2. An asphaltic paving composition as set forth in claim 1, for producing a red-colored pavement, wherein said metallic oxide coloring agent is a synthetic ferric oxide.

3. A colored asphaltic paving composition requiring no after treatments and comprising by weight two percent to eight percent exfoliated vermiculite; granulated rubber in an amount ranging from 2.2 to 4.0 times the weight of the vermiculite and constituting six percent to eighteen percent of the composition; forty-five percent to eighty percent of fine sand and stone screenings; ten percent to twenty-eight percent of a bituminous binder selected from a group consisting of tar and asphalt; and four percent to twenty percent synthetic ferric oxide; said vermiculite having a particle size in the range of approximately 0.04 inch to approximately five-sixteenth inch, said granulated rubber having a particle size in the range of approximately 0.04 inch to approximately one-fourth inch, and said sand and stone screenings having a maximum particle size of approximately one-eighth inch.

* * * * *

UNITED STATES PATENT AND TRADEMARK OFFICE
CERTIFICATE OF CORRECTION

PATENT NO. : 4,332,620
DATED : June 1, 1982
INVENTOR(S) : Robert L. Quinn

It is certified that error appears in the above-identified patent and that said Letters Patent is hereby corrected as shown below:

Column 2, line 16, after the period insert --No aftertreatments of the deposited surface are required to attain the desired color effect.--

Claim 1, column 2, line 36, "after treatments" should be --aftertreatments--.

Claim 1, column 2, at the end of line 43, insert a comma (;).

Claim 3, column 2, line 51, "after treatments" should be --aftertreatments--.

Signed and Sealed this

Fifth Day of April 1983

[SEAL]

Attest:

GERALD J. MOSSINGHOFF

Attesting Officer     Commissioner of Patents and Trademarks